United States Patent Office 3,469,417
Patented Sept. 30, 1969

3,469,417
TORQUE TRANSMITTING COUPLING
John Russell Wakelin, 8 Red Gate Lane,
Southboro, Mass. 01772
Filed Dec. 7, 1967, Ser. No. 688,835
Int. Cl. F16d 3/50
U.S. Cl. 64—12                                    15 Claims

ABSTRACT OF THE DISCLOSURE

A coupling comprising parts adapted to be secured to the adjacent ends of two shafts and flexible transmitting elements connecting the two parts to each other for transmitting rotation of one part to the other while permitting movement of the parts relative to each other.

BACKGROUND OF THE INVENTION

The principal objects of the invention are to provide an improved kind of flexible coupling which embodies in its construction the possibility of a range of uses for a given size, to wit, for low torque transmission, intermediate torque transmission and high torque transmission; to provide a flexible coupling which can be depended upon to fail at a predetermined torque thus to function as a safety device; to provide a flexible coupling in which the torque transmitting elements are self-locking and yet are readily replaceable without need for implements for effecting their replacement; to provide a flexible coupling which is relatively easy to manufacture and to assemble; and to provide a flexible coupling which is reliable and may be built to carry large or small loads depending upon its use without change in its basic design.

SUMMARY

As herein illustrated, the coupling comprises two juxtaposed parts having coaxial bores adapted to receive aligned shafts, a plurality of resilient connector elements bridging the space between the parts, and means connecting the opposite ends of the connector elements to the parts respectively, so that the parts are free to move relative to each other within the elastic limit of the connector elements. The means for connecting the elements are shoulders on the connectors and the pasts contain slots spaped circumferentially about the bores through which the connector elements pass and between the slot abutment behind which the shoulders are disposed. The shoulders are heads at the opposite ends of the connectors. The parts are cup-shaped, each having a circular bottom wall and peripherial walls and are disposed bottom-to-bottom with the peripheral walls extending axially in opposite directions. The slots are in the bottom walls and since the heads are larger than the slots the peripheral walls contain openings in communication with the slots through which the connectors are adapted to be inserted. The connectors are substantially flat straps of lesser thickness than the openings and at least as wide as the slots. Optionally there are retainer members introduceable into the slots beneath the openings which close the latter. The aforesaid elements have end portions adapted to be bent over the heads of the connector straps. Tension bars may also be employed intermediate the parts, placed at right angles to each other with their opposite ends engaged with diametrically disposed loops comprised of the portions of the connectors situated between the parts. The tension bars may have at their ends rollers for engagement with the loops.

The invention will now be described in greater detail with reference to the accompanying drawings wherein.

Figure 1:
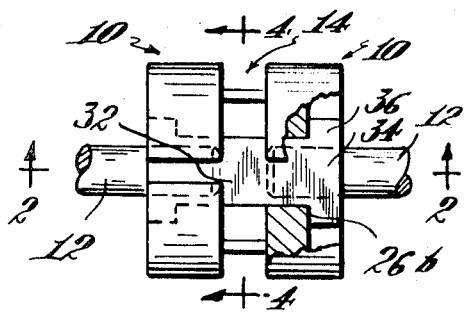
FIG. 1 is an elevation of the coupling with portions in section.

The invention, as related above, is an improved flexible cupling comprising essentially a pair of juxtaposed parts 10 adapted to be secured to the adjacent ends of axially aligned shafts 12, and flexible connecting elements 14 connecting the parts 10 to each other so that rotation imparted to one of the shafts 12 is transmitted to the other through the flexibly connected parts.

Each part 10 is of circular cross-section and contains a centrally located hole 16 through it for receiving an end of one of the shafts 12. A radial hole through each part extending from the peripheral surface through to the interior of the hole 16, and threaded to receive a set screw, provides means for fixing the part to the shaft.

The parts 10 are cup-shaped, each having a circular bottom wall 20 and a circumferential wall 22 and are arranged with the bottom walls in confronting spaced parallel relation to each other and with the peripheral walls extending axially away from each other. Although the parts are shown spaced part in FIGS. 1 and 2, they may be substantially abutting. Hubs 24 internally of the cup-shaped parts extend from the bottom walls 20 in concentric relation to the peripheral wall 22 and contain the holes 16. The hubs 24 are of small external diameter than the internal diameter of the peripheral walls so that there are annular spaces or grooves 26 between the two. At quarter-circular intervals slots 28 of rectangular cross-section are provided which extend from the bottoms of the annular grooves 26 through the bottom walls 20 of the parts. The slots 28 are parallel to the axes of the holes 16 and are at right angles to the diameters on which they are located. The portions 26a of the bottoms of the annular grooves situated between the slots 28 provide abutments 26b at each side of each slot. Axially formed radial openings 30 through the peripheral walls located symmetrically with respect to the slots 28 provide access to these slots 28.

While four slots are illustrated herein, it is within the scope of the invention to employ a lesser or greater number of slots depending upon the size of the parts and the load that is to be transmitted.

As herein illustrated, the parts 10 are comprised of pressed and sintered powered metal aluminum or the equivalent; however, they may be die-cast or machined.

Figure 5:
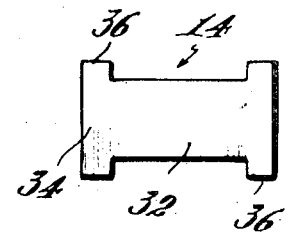
FIG. 5 is a plan view of a single connector element.

The connector elements 14, one of which is shown in FIG. 5, each comprises a flat flexible strap of an elastomer having a shank portion 32 which is at least as wide as the slots and preferably slightly wider so that under tensile stress the edges of the strap will continue to have a substantial amount of frictional contact with the edges of the slots and head portions 34 which are of substantially greater width than the slots and provide, in conjunction with the shank portion at each end, shoulders 36—36 which cannot be pulled endwise through the slots. The connector elements 14 are no thicker than and may be of lesser thickness than the depths of the slots and preferably are punched or die-cut from sheet urethane.

The connector elements 14 are mounted in the slots 28 by pressing them edgewise through the openings 30 so as to engage the shank portions 32 in the slots 28 and to dispose the head portions 34 in the annular grooves 26 with the shoulders 36—36 bridging the inner ends of the slots 28 and resting upon the abutments 26b at the bottoms of the annular grooves 26. Preferably the heads 36 correspond substantially in their axial dimensions to the depth of the annular grooves 26, so that they are confined within the grooves with their outer ends substantially flush with the outer sides of the parts. However, they may be of greater or lesser axial length without departing from the spirit of the invention.

When thus assembled the parts are yieldably connected by the connector elements so that they can give in parallel planes relative to each other, they can rotate relative to each other and they can rock relative to each other, all within the limits imposed by the elastic limit of the connector elements. The connector elements may be comprised of any elastomer having the properties of elasticity, durability and strength required for the particular application for which the coupling is to be used.

Figure 3:
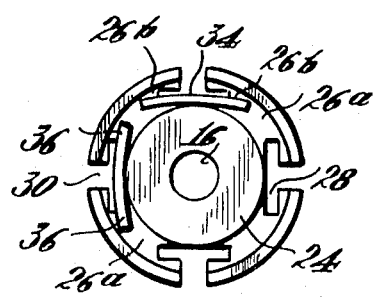
FIG. 3 is an elevation taken at the right or left side of FIG. 1.
Figure 4:
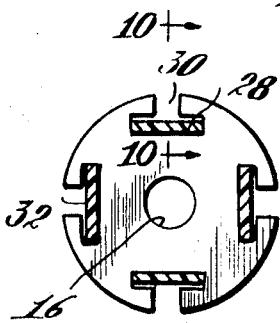
FIG. 4 is a vertical section taken on the line 4—4 of FIG. 1.
Figures 11, 12:
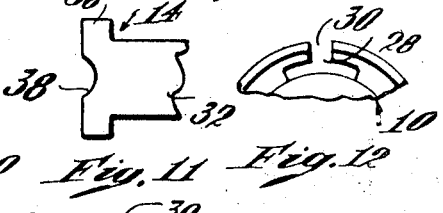
FIG. 11 is a fragmentary plan view of the head at one end of a connector element containing a notch.
FIG. 12 is a fragmentary elevation of one of the parts provided with arcuate slots, only one of which is shown, for receiving the connector elements.
Figure 13:
FIG. 13 is a fragmentary elevation like FIG. 12 showing the arcuate slot facing in the opposite direction.

Although the slots 28 are described and shown in FIGS. 3, 4 and 5 as rectangular and as having straight sides at right angles to the diameter on which they are located, they may be arcuate as shown in FIG. 12, and since the connector elements are flexible the connector elements will accommodate themselves to the curvature of the slots because of their flexibility. In FIG. 12 the arcuate slots are concentric with the axis of the holes; however, they may be curved in the opposite direction, that is, facing outwardly from the axis of the holes, as shown in FIG. 13.

For some applications the connector elements will be dimensioned to purposely fail when a torque of predetermined amount is exceeded thereby to protect the equipment in which it is used from damage. Such failure may be by an actual destruction of the connector elements or by distortion thereof sufficiently to pull the head portions 34 through the slots 28 and/or to force them out through the openings 30. The point at which distortion of the head portions will take place may be anticipated and controlled by providing notches 38 of predetermined size in the ends of the head portions as shown in FIG. 11, so that the shoulders 36—36 will collapse.

Figure 2:
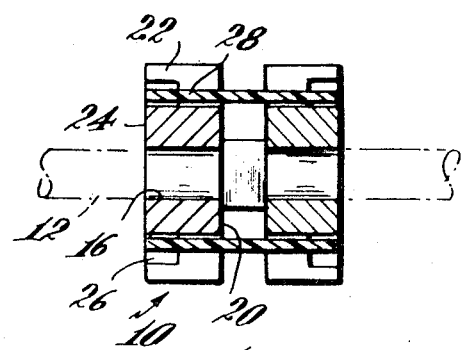
FIG. 2 is a diametrical section taken on the line 2—2 of FIG. 1.

As related above, the coupling is designed for low, medium and high torque transmission. Medium torque transmission is provided when the parts are closely adjacent and the straps extend from one to the other without substantial slack as shown in FIGS. 1 and 5. For low torque transmission the straps are lengthened so that there is a considerable amount of slack between the coupling. For high torque transmission one or more tension bars are used as shown in FIGS. 6, 7 and 8.

Figure 7:
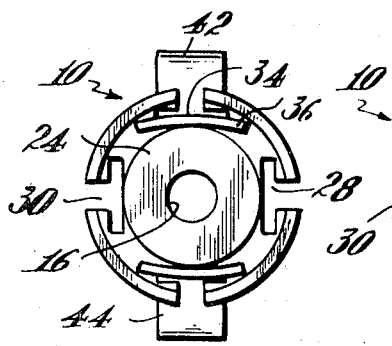
FIG. 7 is an elevation of the left- or right-hand side of FIG. 6.
Figure 6:
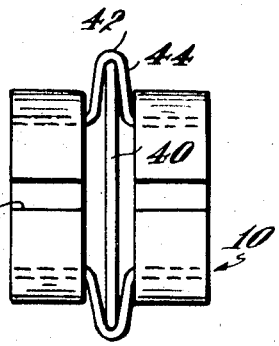
FIG. 6 is a modification of the coupling provided with a tension bar.

A coupling provided with a single tension bar 40 is shown in FIGS. 6 and 7, the bar comprising a strip of rigid metal disposed between the parts between a diametrically disposed pair of the connector elements with its ends engaged within the loops 42 of the connector elements comprised of radially, outwardly displaced portions 44 of the connector elements situated between the parts. The tension bar 40, by displacement of the connector elements, imparts an initial stress to the connector elements which resists to a higher degree relative movement of the parts with respect to each other than the relaxed coupling connector elements. The tension bars 40 may have flat, smoothly rounded ends, as shown in FIG. 6, or may be provided with notches 48 mounting roller bearings 50 to reduce the friction between the ends of the tension bar and the connector element so that the relative movement of the parts may take place without imposing unequal stresses on the portions of the connector elements at opposite sides of the tension bar.

Figure 8:
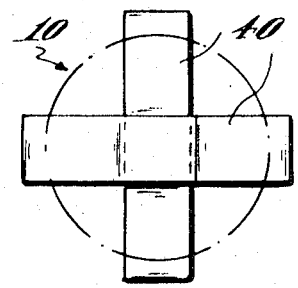
FIG. 8 is a plan view of a pair of tension bars arranged at right angles to each other.
Figure 9:
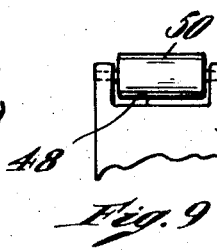
FIG. 9 is a fragmentary elevation at the end of a tension bar provided with a roller bearing.

A coupling provided with two tension bars 40 arranged at right angles to each other is shown in FIG. 8. To insure operation of the tension bars in substantially the same plane each is offset midway between its ends to receive the other. The ends of these tension bars like that shown in FIG. 9 may be provided with roller bearings.

Figure 14:
FIG. 14 is a fragmentary elevation of one of the parts showing radially spaced slots.

As thus far described, a single slot is provided on each radius. However, two or more slots may be employed as shown in FIG. 14, and when this constructed the connectors extending between the parts will be parallel to each other. With two or more radially spaced slots various combinations may be obtained which enable providing a coupling in which resistance to displacement in one direction is greater or less than in another direction.

Figure 10:
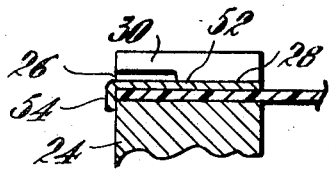
FIG. 10 is a fragmentary section taken on the line 10—10 of FIG. 4 showing a retainer element.

The slots 28 in which the shank portions of the connector elements are disposed may be somewhat greater in depth than the thickness of the connector elements to facilitate inserting the connector elements and also to enable using connector elements of different thickness to provide for a range of thicknesses and hence torque transmission. This greater depth may be taken advantage of to provide for reinforcement at the ends of the connector elements by inserting a deformable metal plate 46, corresponding in width to the slot, into the slot between it and the connector element as shown in FIG. 10, and bending the outer end 54 downwardly over the head of the connector element. The plate 46 bridges the opening 30 and thus prevents distortion of the connector element when subjected to severe stress which might dislodge the head end from the part.

From the foregoing it is clearly apparent that the device is comprised of easy to manufacture, low cost components which can be easily assembled and by the choice of size and strength provide for transmitting low, medium and high torque as well as limited torque.

I claim:

1. A coupling comprising two juxtaposed parts having coaxial holes to receive aligned shafts, said parts also containing slots spaced peripherally about the holes between which are abutments, a plurality of resilient flexible connectors bridging the space between said parts, and shoulders at the opposite ends of the connectors disposed behind the abutments, said shoulders comprising heads at the opposite ends of the connectors of greater width than the slot which anchor the ends to the parts, each head being provided with means to cause it to collapse at a predetermined torque.

2. A coupling according to claim 1, wherein the last-named means comprises notches situated symmetrically with respect to the longitudinal median line of the connector.

3. A coupling according to claim 1, wherein said parts are cup-shaped, each having a circular bottom wall and a peripheral wall, the bottom walls confronting each other and the peripheral walls extending axially in opposite directions, the bottom walls having peripherally spaced slots and the connectors extending through the slots and having heads, which are of larger size than the slots, engaged with the interior sides of the bottom walls.

4. A coupling according to claim 2, wherein there are hubs concentric with the peripheral wall and of smaller diameter than the peripheral wall which contain the holes and which provide, in conjunction with the peripheral walls, annular grooves, said slots opening into said grooves and said heads being confined within the grooves and bridging the slots at the bottoms of the grooves.

5. A coupling according to claim 1, wherein the connectors are straps comprising shanks with a head on each end, the shanks having a thickness less than the width of said openings and a width at least equal to the width of said slots, the heads comprising integral shoulders projecting from opposite edges of the straps, whereby the straps may be inserted edgewise through the openings and then turned so that the shoulders overlap the abutments at opposite sides of said slots.

6. A coupling according to claim 1, wherein the parts contain grooves which confine the heads.

7. A coupling according to claim 1, wherein said slots are of substantially rectangular configuration and are disposed with their long sides at right angles to the diameter on which they are located.

8. A coupling according to claim 1, wherein a tension bar is disposed between the parts with its opposite ends engaged within diametrically disposed loops comprised of portions of the connectors situated between the parts.

9. A coupling according to claim 8, wherein the tension bar has at its opposite ends roller bearings.

10. A coupling according to claim 1, wherein a pair of tension bars are disposed at right angles to each other and between the parts with their diametrically located ends engaged with diametrically disposed loops comprised of portions of the connectors situated between the parts.

11. A coupling according to claim 1, wherein a retainer element is disposed in each slot between the outer side thereof and the connector element so as to bridge the opening in the peripheral wall.

12. A coupling according to claim 11, wherein an end portion of each retainer element is bent over the end of the head against the part.

13. A coupling according to claim 1, wherein there are radially spaced slots for receiving connectors with the portions thereof between the parts substantially parallel to each other.

14. A coupling according to claim 1, wherein there are radially spaced slots for optionally receiving certain of the connectors in the outer ones of the slots and others of the connectors in the inner ones of the slots.

15. A coupling according to claim 1, wherein there are radially spaced slots for optionally receiving all of the connectors in the outer slots or all of the connectors in the inner slots.

References Cited

UNITED STATES PATENTS

| | | | |
|---|---|---|---|
| 988,742 | 4/1911 | Stauber | 64—15 |
| 2,457,507 | 12/1948 | Strachovsky | 64—11 |
| 2,884,240 | 4/1959 | Loughlin | 64—15 X |
| 2,901,896 | 9/1959 | Reich | 64—11 |
| 3,063,262 | 11/1962 | Greene et al. | 64—27 |

FOREIGN PATENTS

| | | |
|---|---|---|
| 203,378 | 9/1923 | Great Britain. |
| 235,396 | 6/1925 | Great Britain. |
| 636,110 | 10/1936 | Germany. |

HALL C. COE, Primary Examiner

U.S. Cl. X.R.

64—15; 287—130